United States Patent [19]
Loreck et al.

[11] Patent Number: 5,327,056
[45] Date of Patent: Jul. 5, 1994

[54] CIRCUIT CONFIGURATION FOR LIMITING THE CUTOFF VOLTAGE ON A SERVOMOTOR

[75] Inventors: Heinz Loreck, Idstein; Mario Engelmann, Neu-Anspach, both of Fed. Rep. of Germany

[73] Assignee: Alfred Teves, GmbH, Frankfurt, Fed. Rep. of Germany

[21] Appl. No.: 50,359

[22] Filed: May 5, 1993

[30] Foreign Application Priority Data

Nov. 5, 1990 [DE] Fed. Rep. of Germany ....... 4035066

[51] Int. Cl.⁵ .................................................. H02P 3/08
[52] U.S. Cl. ..................... 318/563; 318/459; 318/500; 318/519; 318/368
[58] Field of Search ............... 318/560, 563, 599, 611, 318/244, 245, 246, 248, 368, 434, 459, 500, 504, 519, 375, 379, 380, 381; 361/33, 91

[56] References Cited

U.S. PATENT DOCUMENTS

| | | | |
|---|---|---|---|
| 3,619,752 | 11/1971 | Bateika. | |
| 4,325,011 | 4/1982 | Peterson | 318/139 X |
| 4,658,203 | 4/1987 | Freymuth | 323/282 |
| 4,935,678 | 6/1990 | Houst | 318/268 |

FOREIGN PATENT DOCUMENTS

0005079 10/1979 European Pat. Off. .
0348107 12/1989 European Pat. Off. .

Primary Examiner—Bentsu Ro
Attorney, Agent, or Firm—Robert P. Seitter; J. Gordon Lewis

[57] ABSTRACT

A circuit configuration for limiting the cutoff voltage occurring in controlling a servomotor (M) by means of width-modulated DC pulses comprises a power transistor (T2) which, via a capacitor (C) is connected through for a short time when a cutoff voltage appears thus limiting the cutoff voltage. Subsequently the transistor (T2) presents a high impedance. As a result a short-circuiting of the servomotor (M) will be prevented in the phase in which a spring force resets the servomotor into its zero position.

12 Claims, 1 Drawing Sheet

CIRCUIT CONFIGURATION FOR LIMITING THE CUTOFF VOLTAGE ON A SERVOMOTOR

BACKGROUND OF THE INVENTION

This invention relates to the clamping circuitry of a servomotor i.e., to a circuit configuration for limiting the cutoff voltage occurring in controlling a servomotor by means of width-modulated DC pulses.

As is known, overvoltages, caused by the discharge of the energy stored in an inductive load, appear upon cutoff of inductive loads or of partially inductive loads, including electric motors. In DC networks, it is possible to limit the overvoltage by means of a free-wheel diode connected in parallel with the load and acted upon by the DC voltage in the nonconducting direction. However, this measure does not work for a DC motor which also is to be operated as a generator or to be reset unrestrictedly by a mechanical force.

The present invention relates to an electric servomotor for the throttle valve of an automotive vehicle engine. Such a servomotor, for exampled is used for controlling or regulating the drive performance of an engine in conjunction with a traction slip control system. The servomotor is preferably switched on and off via a power transistor, control being effected by width-modulated current pulses. A clamping circuit is needed for the servomotor in order to protect the final stage transistor against overvoltages which are generated when the motor is turned off or when the final stage transistor becomes non-conductive during width-modulated pulse control.

However, cutoff voltage limitation by means of a free-wheel diode cannot be used when the servomotor acts against a tension spring and is to be reset by the spring force into the zero position as quickly as possible. Short-circuiting of the winding of the servomotor via such a free-wheel diode would counteract the return motion of the motor and consequently obstruct a quick resetting of the throttle valve by means of the spring force or a quick position control of the throttle valve.

SUMMARY OF THE INVENTION

It is, thus, an object of this invention to provide a circuit configuration by means of which it is possible to limit the overvoltages occurring when a DC servomotor is turned off, without thereby obstructing the resetting of the motor. Among the practical requirements of such a circuit configuration are low-cost manufacture and simplicity. Any additional actuating connections, additional voltage sources and the like are to be avoided.

It has been found that this object can be achieved by means of a circuit configuration having a so-called free-wheel diode connected in series with a transistor and in parallel with the servomotor, the transistor being connected through for a short time upon the appearance of the cutoff voltage via a capacitor which, on the one hand, is connected to the control electrode of the transistor and, on the other hand, is connected to that connection of the servomotor to which the free-wheel diode is connected.

The inventive circuit configuration can be manufactured at relatively small expense. No additional voltage source is needed for the actuation of the transistor.

Likewise, outward connections, i.e., towards the electronic control unit are not required.

The duration of the through-connection of the transistor of the inventive circuit configuration can be predetermined with sufficient accuracy by means of a corresponding rating of an RC module, i.e. by an ohmic resistor via which the capacitor discharges itself. Further, it is expedient to connect a diode in parallel with the resistor in the charging direction of the capacitor, so that the capacitor is rapidly charged via the diode upon a new actuation of the motor or upon a new turn-on pulse.

According to one embodiment of this invention, the transistor connected in parallel with the servomotor is a power MOS-field-effect transistor whose gate is actuated via the capacitor upon the appearance of the cutoff voltage.

According to another aspect of this invention, a Zener diode connecting the gate with the source protects the field effect transistor (FET) against overvoltages. Expediently, the Zener diode is connected so that, in the non-conducting direction, it serves as overvoltage protection and that, in the conducting direction, it carries the charging current of the capacitor. Thus, for an especially quick charging of the capacitor, the prior-mentioned separate diode, is rendered superfluous.

Further characteristics, advantages and applications of this invention will become evident from the following description, reference being made to the accompanying drawing.

DETAILED DESCRIPTION OF THE INVENTION

Figure 1:
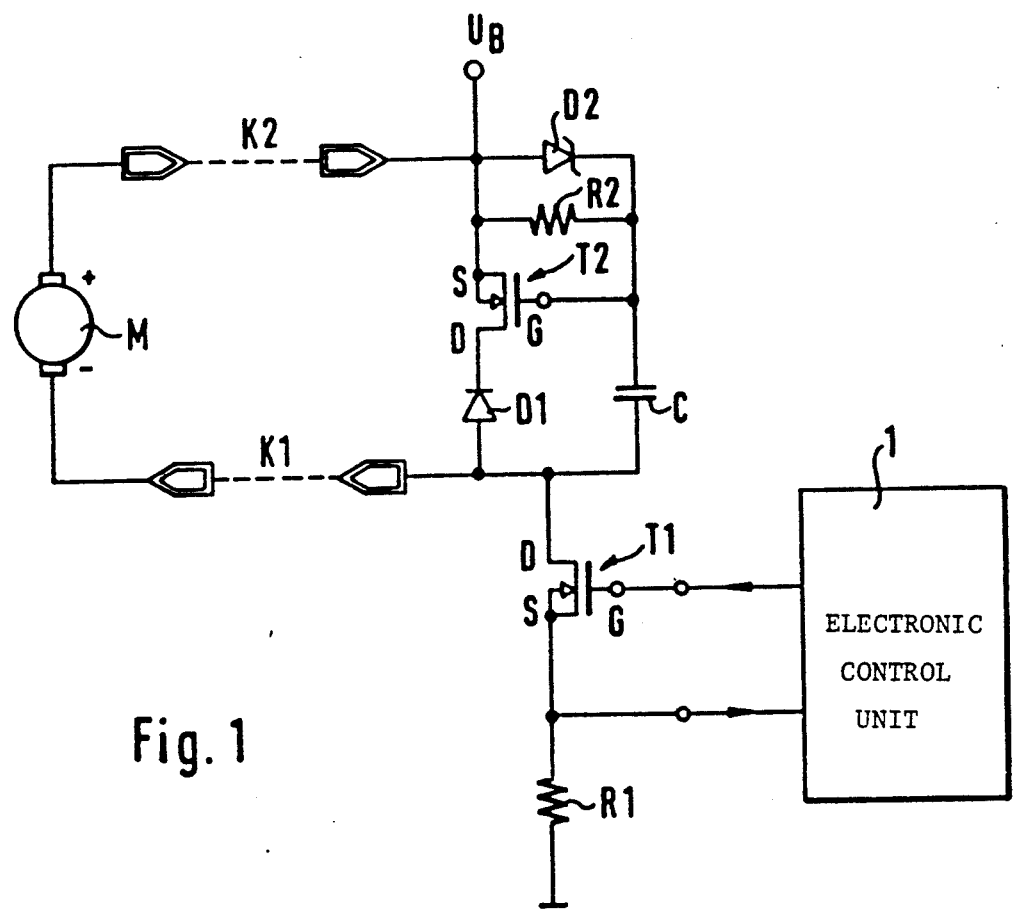
FIG. 1 is a circuit diagram of a circuit configuration according to this invention.

The embodiment of this invention illustrated by FIG. 1 relates to a circuit configuration for limiting the cutoff voltage appearing on the servomotor M of a traction slip control system. The motor M serves to control the position or the angle of rotation of a throttle valve (not shown). The throttle valve determines the drive performance of an automotive vehicle engine. The angle position and the adjusting speed of the throttle valve are controlled by means of width-modulated DC pulses. The servomotor M tensions a return spring (not shown). As soon as the power supply is interrupted, the return spring will supply the drive energy for resetting the motor.

Figure 2:
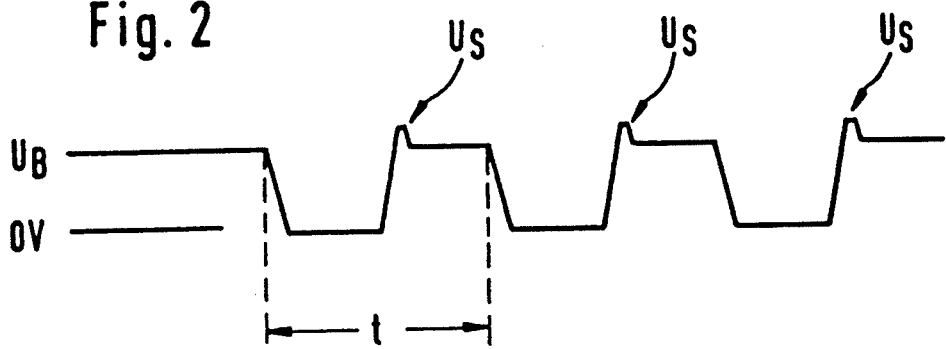
FIG. 2 is a waveform diagram of the potential variation at terminal K1 of the circuit configuration of FIG. 1.

In this case, the adjusting pulses for the motor M are generated by means of a power transistor Ti such as a MOS-field-effect transistor, actuated via an electronic control unit 1. The transistor T1 is operated as a switching transistor. As shown in FIG. 2 the voltage at terminal K1 will be either the battery voltage $U_B$ or almost mass potential (0 V), increased only by a slight voltage drop across a low-impedance graphite resistor R1 due to the current flowing through transistor T1. This voltage drop is not shown in FIG. 2.

The inventive free-wheel clamping circuitry namely a circuit configuration for limiting the cutoff voltage, is connected with the servomotor M via connections K1, K2. This clamping circuitry essentially is composed of a transistor T2, a diode D1 and several elements for actuating the transistor T2. For the embodiment of the invention illustrated, transistor T2 is a power MOS-fieldeffect transistor. Via a capacitor C, the control connection G of transistor T2 is connected with terminal K1 and with drain connection D of the transistor T2 to be protected. Capacitor C is charged and discharged via a resistor R2, with a diode D2 connected in parallel. As shown in FIG. 1, diode D2 is a Zener diode. As a result, the voltage drop on the source-to-gate distance of transistor T2 cannot exceed the break voltage of the Zener diode D2.

A peak voltage $U_S$, as shown in FIG. 2, is formed each time that the final stage transistor T1 becomes non-conductive or when the inductive load of the servomotor M is turned off. Via capacitor C, this peak voltage $U_S$ is transmitted to the control connection gate G of transistor T2 and effects a through-connection of transistor T2. Consequently, the energy stored in the servomotor M will be discharged via the free-wheel diode D1 and via transistor T2, with the result that the cutoff voltage is limited to a value which will not cause any damage to control transistor T1. As the duration t of the width-modulated pulse sequence may be chosen to be greater than the electromechanical time constant of a throttle valve adjusting device, a corresponding dimensioning of the RC module or rather of the resistor R2 and of the capacitor C permits the selection of a time constant for the through-connection of transistor T2 to ensure that, in any case, the time of the through-connection of transistor T2 will be sufficient to limit the cutoff voltage, yet will be short as compared with the electromechanical time constant of the throttle valve adjusting device. After cutoff of the width-modulated pulse sequence, the throttle valve servomotor M will move back into its zero position. In doing so, there is generated at terminals K1, K2 a DC voltage by means of which the control electrode of transistor T2 cannot be actuated because of capacitor C. The connections or terminals K1, K2 of servomotor M are more or less non-conductive so that the servomotor M can quickly be returned into its zero position by means of the force of the (nonillustrated) return spring tensioned upon actuation of the servomotor M.

It is apparent that the present invention provides a comparatively simple circuit which serves to achieve an effective limitation of the cutoff voltage and, hence an effective protection of the actuating transistor T1 against overvoltage and, simultaneously prevents a short-circuiting of the terminals K1, K2 of the servomotor M when the servomotor is reset into its zero position.

We claim:

1. A circuit configuration for limiting the cutoff voltage occurring in controlling a servomotor by means of width-modulated direct-current pulses, characterized in the a so-called free-wheel diode is connected in series with a transistor and in parallel with the servomotor, the control electrode of the transistor being connected to the servomotor via a capacitor so that the transistor is connected through for a short time upon the appearance of the cutoff voltage.

2. A circuit configuration as claimed in claim 1, characterized in that the duration of through-connection of the transistor is predetermined by an ohmic resistor via which the capacitor unloads itself.

3. A circuit configuration as claimed in claim 2, characterized in that a diode poled in the charging direction of the capacitor is connected in parallel with the ohmic resistor.

4. A circuit configuration as claimed in claim 3, characterized in that the transistor connected in parallel with the servomotor is a power MOS-field-effect transistor whose gate is actuated via the capacitor upon the appearance of the cutoff voltage.

5. A circuit configuration as claimed in claim 4, characterized in that the diode poled in charging direction of the capacitor is a Zener diode, said Zener diode connects the gate of the transistor with the source of the transistor to protect the transistor against overvoltages.

6. A circuit configuration as claimed in claim 5, characterized in that the Zener diode is connected so that, in the non-conducting direction, it serves as overvoltage protection and that, in the conducting direction, it carries the charging current of the capacitor.

7. A circuit configuration for limiting the cutoff voltage occurring in controlling a servomotor by mean of width-modulated direct-current pulses, said circuit configuration comprising:
a transistor having a control electrode;
a free-wheel diode connected in series with said transistor and adapted for connection in parallel with a servomotor;
a capacitor connected between said control electrode of said transistor and the connection of said free-wheel diode to said servomotor;
and means for conducting a cutoff voltage through said capacitor to said transistor to effect a through connection by said transistor upon the appearance of said cutoff voltage.

8. A circuit configuration according to claim 7 further including a resistor through which said capacitor discharges and by which the duration of the through-connection of said transistor is determined.

9. A circuit configuration according to claim 8 wherein said means for conducting includes a second diode which is disposed in the charging direction of said capacitor and connected in parallel with said resistor.

10. A circuit configuration according to claim 9 wherein said transistor is a power MOS-field-effect transistor having a gate to which said capacitor is connected and to which said cutoff voltage is conducted.

11. A circuit configuration according to claim 8 wherein said transistor is a power MOS-field-effect transistor having a gate to which said capacitor is connected and to which said cutoff voltage is conducted, and said means for conducting includes a Zener diode, said circuit configuration further includes a source of electrical power, and said Zener diode is connected between said source of electrical power and said gate of said power MOS-field-effect transistor to protect said power MOS-field-effect transistor against overvoltages.

12. A circuit configuration according to claim 11 wherein said Zener diode is disposed to provide overvoltage protection in the non-conducting direction and conduct charging current of said capacitor in the conducting direction.

* * * * *